(12) United States Patent
Bernitzki et al.

(10) Patent No.: US 10,139,539 B2
(45) Date of Patent: Nov. 27, 2018

(54) POLARIZATION SYSTEM

(71) Applicant: JENOPTIK Optical Systems GmbH, Jena (DE)

(72) Inventors: Helmut Bernitzki, Jena (DE); Michael Klaus, Jena (DE); Sven Laux, Segebiet Mansfelder Land (DE); Uwe Schuhmann, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 0 days.

(21) Appl. No.: 15/102,001

(22) PCT Filed: Dec. 4, 2014

(86) PCT No.: PCT/EP2014/003233
§ 371 (c)(1),
(2) Date: Jun. 6, 2016

(87) PCT Pub. No.: WO2015/082070
PCT Pub. Date: Jun. 11, 2015

(65) Prior Publication Data
US 2016/0313482 A1    Oct. 27, 2016

(30) Foreign Application Priority Data

Dec. 5, 2013   (DE) .................. 10 2013 020 353

(51) Int. Cl.
*G02B 1/08* (2006.01)
*G02B 5/30* (2006.01)
*G02B 27/28* (2006.01)

(52) U.S. Cl.
CPC ............ *G02B 5/3075* (2013.01); *G02B 1/08* (2013.01); *G02B 5/3041* (2013.01); *G02B 5/3066* (2013.01); *G02B 27/283* (2013.01)

(58) Field of Classification Search
CPC .......... C03C 4/082; C03C 4/10; G02B 13/14; G02B 17/0892; G02B 19/009;
(Continued)

(56) References Cited

U.S. PATENT DOCUMENTS 9,297,936 B2    3/2016  Erxmeyer et al.
2006/0050370 A1*  3/2006  Maier .................. G02B 5/3075
                                                 359/352

FOREIGN PATENT DOCUMENTS

DE    102004025646 A1 * 12/2005  ........... G02B 5/0833
DE    10 2010 017 106 A1    12/2011
(Continued)

OTHER PUBLICATIONS

WO 2010034367, Pazidis Alexandra, Dielectric Mirror and Method for the production thereof, and a projection illumination system for microlithography having such a mirror. English Translation.*
(Continued)

*Primary Examiner* — Thomas K Pham
*Assistant Examiner* — Alberto J Betancourt
(74) *Attorney, Agent, or Firm* — Muncy, Geissler, Olds & Lowe, P.C.

(57) ABSTRACT

A polarization system having a first substrate with a first layer system, and at least one second substrate with a second layer system disposed downstream in a beam path from the first substrate formed by a beam source. The first and second layer systems have a first stack on the substrate and a second stack on the first stack; wherein the first stack comprises an alternating sequence of high and low refractive index oxidic layers; the second stack having an alternating sequence of high and low refractive index fluoridic layers. The first layer system splits an unpolarized beam and the second layer system splits the beam again such that the proportion of a
(Continued)

polarized beam downstream of the second layer system is greater than that downstream of the first layer system.

10 Claims, 3 Drawing Sheets

(58) Field of Classification Search
CPC ............... G02B 19/0095; G02B 21/16; G02B 27/4294; G02B 5/208; G02B 5/3075; G02B 5/3091; G02B 5/0891; G02B 5/3058; G02B 27/286; G02B 27/283; G02B 5/3083; G02B 13/00; G02B 17/08; G02B 1/02; G02B 1/08; G02B 27/28; G03F 7/70; G03F 7/70566; G03F 7/70225; G03F 1/24; G03F 7/70308; G03F 7/70575; G03F 9/70
USPC ....... 359/350–361, 634, 859, 885, 887, 889, 359/890, 489.07, 352, 489.11, 359, 359/485.01; 355/67; 430/5
See application file for complete search history.

(56) References Cited

FOREIGN PATENT DOCUMENTS

| EP | 1 306 665 A2 | 5/2003 | |
|----|---|---|---|
| WO | WO 2005114266 A1 | 12/2005 | |
| WO | WO 2010/034367 A1 | 4/2010 | |
| WO | WO 2010034367 A1 * | 4/2010 | ........... G02B 5/0833 |

OTHER PUBLICATIONS

DE102004025646A1, Laux, High-Reflecting Dielectric mirror and method for the production thereof. English Translation.*

* cited by examiner

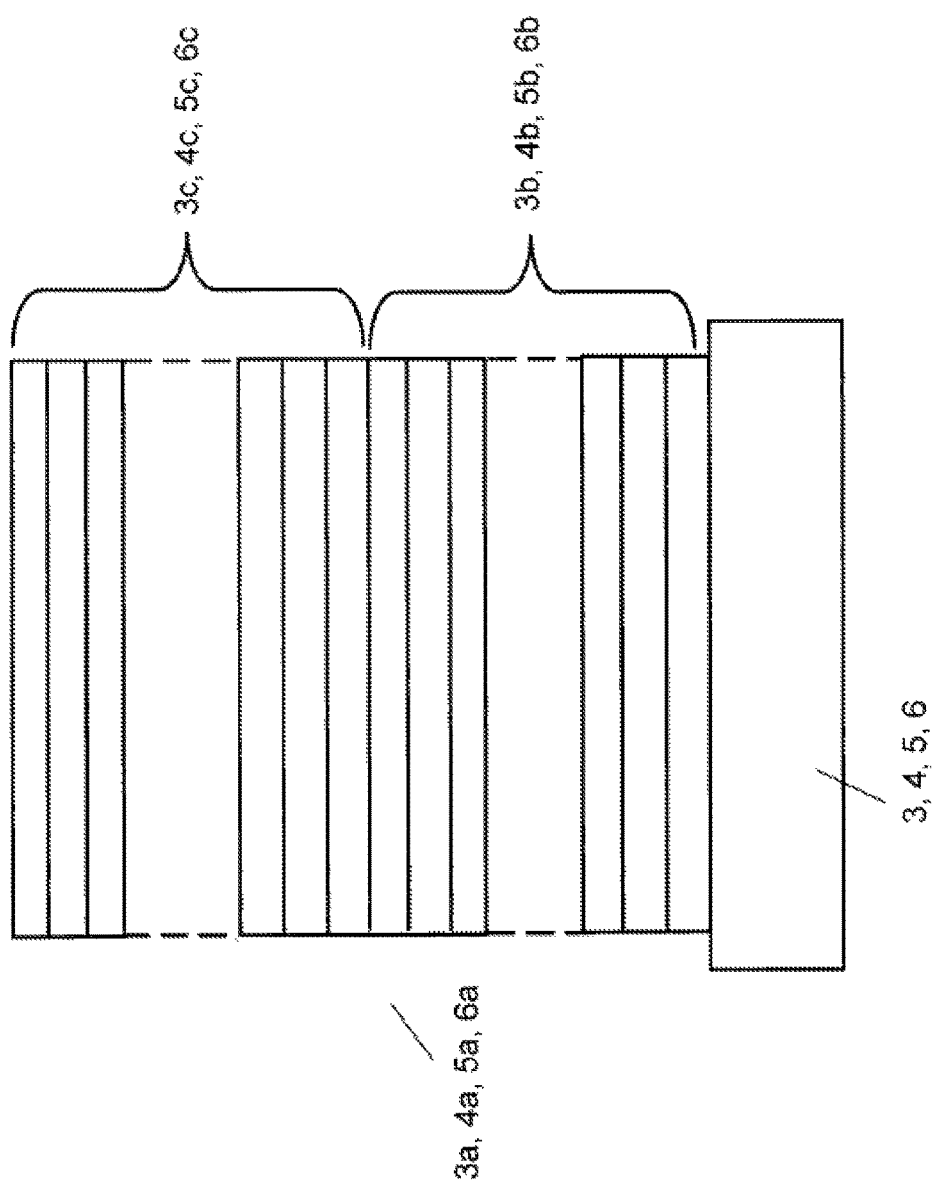

POLARIZATION SYSTEM

This nonprovisional application is a National Stage of International Application No. PCT/EP2014/003233, which was filed on Dec. 4, 2014, and which claims priority to German Patent Application No. 10 2013 020 353.8, which was filed in Germany on Dec. 5, 2013, and which are both herein incorporated by reference.

BACKGROUND OF THE INVENTION

Field of the Invention

The present invention relates to a polarization system.

Description of the Background Art

Photolithography is one of the central methods of semiconductor and microsystem technology for the production of integrated circuits and further products. Here, via exposure optics, a light source, for instance a laser source, exposes a mask, the pattern of which is imaged with the aid of projection optics onto a semiconductor wafer coated with photoresist. The resolution capacity, that is to say the capacity of the optical system to image the smallest structures in the photoresist, is determined substantially by the light wavelength used and the capability of the system to intercept sufficient orders of diffraction of the mask. It may be described approximately by:

$$CD = k_1 * (\lambda / NA).$$

Here, CD is the critical dimension, which means the smallest line width that can be imaged (often also designated by the English terms minimum feature size or critical dimension), k1 is a factor dependent on the imaging and resist system, $\lambda$ the wavelength of the light used and NA the numerical aperture of the last lens before the wafer.

In addition to the development of exposure technology and the use of smaller and smaller wavelengths down to the low UV range (including improving the numerical aperture), numerous further techniques for improving the process window by means of the reduction in the k1 value have been developed and introduced. In addition to improvements in the photoresists, these are primarily what are known as resolution-improving techniques. These include techniques for optimizing the exposure, such as oblique illumination (English off-axis illumination, OAI) or the exposure with polarized light.

Systems for producing polarized light are sufficiently well known from the prior art. For example, these can be cemented systems, in which crystals of various orientation directions are joined to one another. However, such systems cannot be used in the UV range, since the short-wave radiation would damage or even destroy the joining material. Also known are substrates with vapor-deposited layers, by means of which the light is broken down into a component transmitted the substrate and polarized and a component reflected on the layer and polarized. The transmitted and polarized component often used in the prior art is, however, transmitted with high losses at short wavelengths, so that use in the UV range is likewise possible only with very great difficulty.

SUMMARY OF THE INVENTION

It is therefore an object of the present invention to provide an improved polarization system which converts initially unpolarized radiation into polarized radiation, wherein the energy density remains approximately maintained during passage through the polarization system.

In a basic idea of the invention, a polarization system has the following features: a first substrate composed of a first substrate material with a first layer system applied thereto and, disposed downstream in a beam path formed by a beam source, at least one second substrate composed of a second substrate material with a second layer system applied thereto, wherein the first and second layer systems comprise a first stack applied to the substrate and a second stack applied to the first stack, wherein the first stack comprises an alternating sequence of high and low refractive index oxidic layers, wherein the second stack comprises an alternating sequence of high and low refractive index fluoridic layers, wherein the first layer system splits an unpolarized beam, which forms the beam path and impinges on the layer system at an angle $\Phi$ that is greater than the Brewster angle for the substrate material used, into a first first component, which is for the most part polarized and is transmitting the substrate, and at least one second component, which is for the most part polarized and is reflected at the layer system, wherein the first layer system is designed in terms of its number of oxidic and fluoridic layers in such a way that the proportion of the reflected and polarized second component is at least 90%, wherein the second layer system splits a beam, which forms the beam path, has a proportion of the for the most part polarized second component of at least 90% and impinges on the layer system, into a first first component, which is for the most part polarized and is transmitting the substrate, and at least one second component, which is for the most part polarized and is reflected at the layer system, wherein the proportion of the for the most part polarized second component is greater downstream of the second layer system than downstream of the first layer system.

The invention therefore makes use of the finding that it is not the polarized component afflicted with high losses and transmitting through the substrate that is used for the further beam guidance but the polarized component reflected at the layer system, wherein the system is tuned for high entry angles greater than the Brewster angle for this purpose.

It is still more beneficial in a preferred embodiment if the proportion of the reflected and polarized second component is at least 95%, preferably 99%.

In a further preferred embodiment, the beam which impinges on the second layer system is likewise greater than the Brewster angle for the substrate material used.

In a further preferred embodiment, a third substrate composed of a third substrate material and a fourth substrate composed of a fourth substrate material having respective third and fourth layer systems are disposed downstream in the beam path, wherein the third and fourth layer systems comprise a first stack applied to the substrate and a second stack applied to the first stack, wherein the first stack comprises an alternating sequence of high and low refractive index oxidic layers and the second stack comprises an alternating sequence of high and low refractive index fluoridic layers. As a result of the provision of further substrates with the respectively applied layer systems, the level of polarization of the second component reflected at the layer systems can be increased further. Preferably, the beam which impinges on the third and fourth layer system is also greater than the Brewster angle for the substrate material used.

In a further preferred embodiment, the at least two substrates are disposed in such a way that an incident beam of the beam path is parallel to an outgoing beam path. As a result of such an embodiment, such a polarization system can be incorporated particularly simply as a subsystem in larger systems.

In a further preferred embodiment, the substrate materials used are quartz glass and/or calcium fluoride, wherein in particular the first substrate material is calcium fluoride and each further substrate material is quartz glass. In particular by means of a combination of the substrate materials, the outlay on costs can be minimized in that, in high-energy applications, that is to say when radiation wavelengths below 250 nm are used, only the first substrate is composed of calcium fluoride, while the other substrates are built up from the cheaper substrate material quartz glass.

In a further preferred embodiment, the oxidic layers used are high refractive index aluminum oxide and low refractive index silicon oxide. In a further preferred embodiment, the fluoridic layers used are high refractive index lanthanum fluoride, gadolinium fluoride or neodymium fluoride and low refractive index magnesium fluoride, aluminum fluoride, cryolite or chiolite.

In a further preferred embodiment, the sum of the number of layers of the first stack and second stack is greater than 40, preferably greater than 60.

In a further preferred embodiment, the polarization system is designed for wavelength ranges between 170 and 230 nm. This means that the optical thickness of the respective layer pack is one quarter of the application wavelength, wherein the thickness must also be adapted to the angle of incidence by a correction factor K such that an optimal polarization effect is produced and the polarization range is expanded by specific smoothening layers.

It goes without saying that the embodiments just described can be represented on their own or in combination with one another. If a preferred embodiment comprises an "and/or" link between a first feature and a second feature, this is to be read in such a way that the embodiment has both the first feature and also the second feature and, according to a further embodiment, has either only the first feature or only the second feature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows a schematic structure of a layer system according to the invention on a substrate for a polarization system according to the invention;

DETAILED DESCRIPTION

Figure 1:
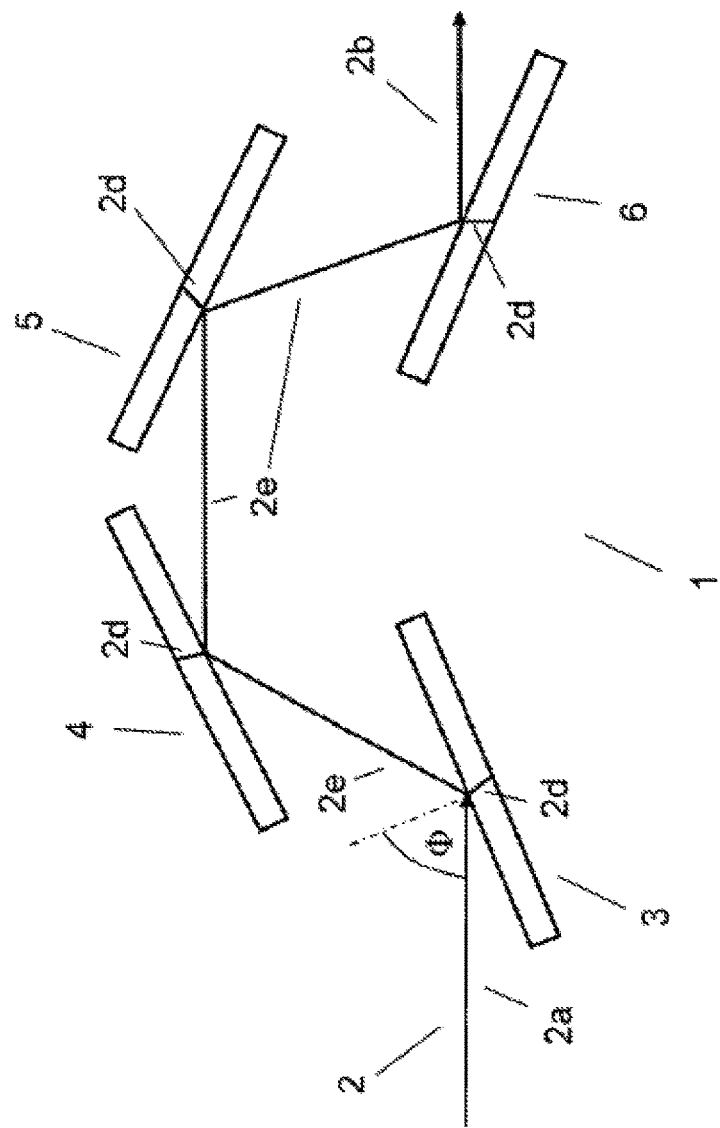
FIG. 1 shows a schematic structure of a polarization system according to the invention.

FIG. 1 shows, in a schematic view, the structure of a polarization system 1 according to the invention. The system is fed by a radiation source, not specifically illustrated, for example a laser source, for example having a wavelength of 193 nm.

The laser source emits inadequately polarized radiation, which forms a beam path 2. The unpolarized radiation has a so-called P polarized component which, according to the invention, is designated as first component 2d, and a so-called S polarized component which, according to the invention, is designated as second component 2e. This radiation impinges on the first substrate 3 or layer system 3a at an angle Φ (the angle Φ is defined as the angle between the incoming radiation and the surface normal to a substrate plane) that is greater than the Brewster angle for the substrate materials used.

The polarization system has a total of four substrates 3, 4, 5 and 6, on which in each case a dielectric layer system 3a, 4a, 5a and 6a has been deposited. The layer system, the structure of which is to be discussed in more detail later, has the task of reflecting only a small proportion of the first component 2d, so that a major part of this component is transmitted through the respective substrate. Conversely, the layer system is formed in such a way that a major part of the second component 2e is reflected at the layer system. The beam path 2 after the second substrate preferably still has at least 90%, particularly preferably at least 99%, of the second component 2e. With an increasing number of substrates and corresponding layer systems, a better and better polarization effect can be achieved with an only insignificant reduction in the transmission of the second component. By means of a polarization system having a total of four substrates, the proportion of the second component in relation to the proportion of the first component can thus be increased further.

Figure 3A:
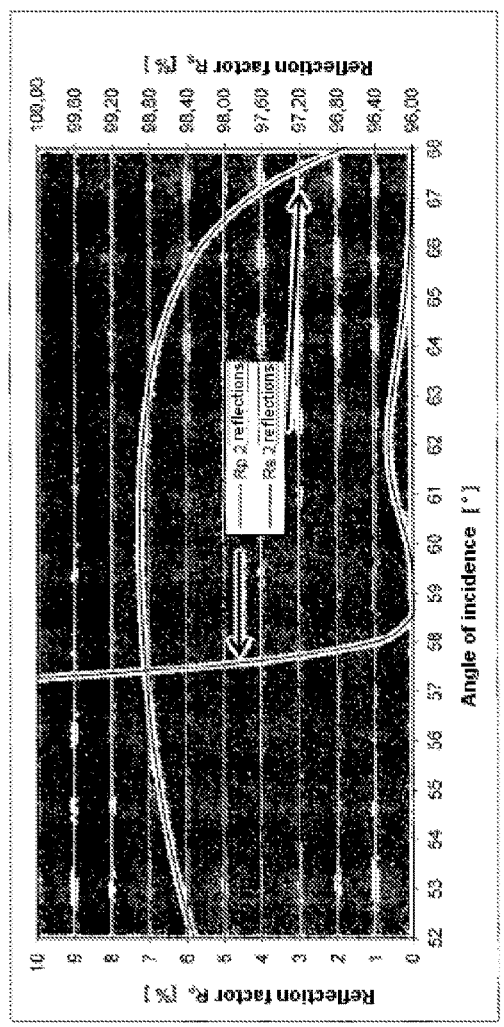
FIG. 3 shows an illustration of the radiation reflected at the layer system according to the invention and transmitted through the layer system.
Figure 3B:
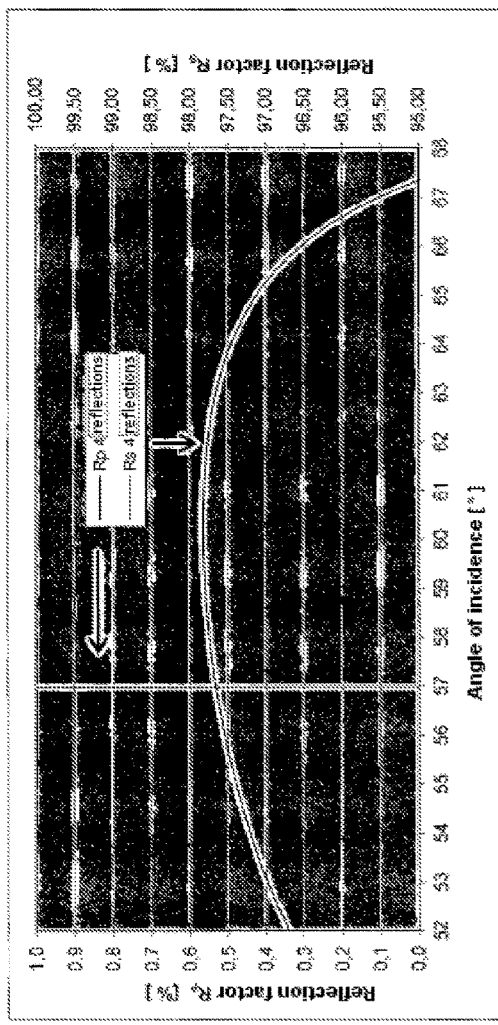

The four substrates are disposed in such a way that an incident beam 2a from the beam path 2 is parallel to an outgoing beam path 2b. It is thus possible to incorporate the polarization system 1 relatively simply as a subsystem in further systems, for example in a photolithography system FIG. 3a and FIG. 3b show an exemplary embodiment, wherein FIG. 3a depicts the reflection states as a function of the angle of incidence Φ after the second substrate and FIG. 3b depicts the reflection states as a function of the angle of incidence Φ after the fourth substrate. As can be gathered from the two figures, the proportion of the first component 2d (P component or $R_P$) at the reflected beam can, so to speak, be reduced t0 0 while the proportion of the second component 2e at the reflected beam is still far above 90%.

FIG. 2 now shows the structure of a layer system according to the invention. The high refractive index layer system 3a, 4a, 5a and 6a comprises, according to the invention, a first stack 3b, 4b, 5b and 6b of oxidic layers, which have been applied to the substrate, and a second stack 3c, 4c, 5c and 6c of fluoridic layers, which have been applied to the first stack. Both the first stack and the second stack have an alternating sequence of high and low refractive index individual layers. In this embodiment, the oxidic materials used are high refractive index aluminum oxide and low refractive index silicon oxide, while the fluoridic materials used are high refractive index lanthanum chloride or gadolinium fluoride and low refractive index magnesium fluoride or aluminum fluoride.

In the exemplary embodiment according to FIG. 3a and FIG. 3b, neodymium fluoride was used as further high refractive index fluoride.

Overall, by means of the solution according to the invention, a polarization system having a high proportion of the reflected and polarized component, which can be used in a photolithography system, for example, is thus provided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A polarization system comprising:
   a first substrate composed of a first substrate material with a first layer system disposed on the first substrate; and
   at least one second substrate disposed downstream from the first substrate in a beam path formed by a beam source, the at least one second substrate being composed of a second substrate material with a second layer system disposed on the second substrate material,
   wherein the first layer system comprises a first stack disposed on the first substrate and a second stack disposed directly on the first stack,
   wherein the second layer system comprises a third stack disposed on the second substrate and a fourth stack disposed directly on the third stack,
   wherein the first stack and the third stack comprise an alternating sequence of high and low refractive index oxidic layers,
   wherein the second stack and the fourth stack comprise an alternating sequence of high and low refractive index fluoridic layers,
   wherein the first layer system splits an unpolarized beam, directing a first beam portion of the unpolarized beam on the beam path, the unpolarized beam impinging on the first layer system at an angle $\Phi$ that is greater than the Brewster angle of the first substrate material,
   wherein the unpolarized beam is split into a second beam portion having a first polarized component propagating through the first substrate, and the first beam portion having at least one second polarized component, which is reflected from the first layer system,
   wherein the first layer system is provided with a number of oxidic and fluoridic layers such that the second polarized component is at least 90% of the first beam portion,
   wherein the second layer system splits the first beam portion into a third beam portion having the first polarized component, which is transmitted through the second substrate, and a fourth beam portion having the at least one second polarized component reflected by the second layer system, and
   wherein the second polarized component has a greater proportion of the fourth beam portion downstream of the second layer system than the second polarized component has in the first beam portion downstream of the first layer system,
   wherein the first substrate material is calcium fluoride, and
   wherein the second substrate material is quartz glass.

2. The polarization system as claimed in claim 1, wherein the second polarized component is at least 95% of the first beam portion.

3. The polarization system as claimed in claim 1, wherein the first beam portion impinges on the second layer system at an angle greater than the Brewster angle for the second substrate material.

4. The polarization system as claimed in claim 1, wherein a third substrate composed of a third substrate material and a fourth substrate composed of a fourth substrate material with respective third and fourth layer systems are disposed downstream of the first and second substrates, wherein the third and fourth layer systems comprise a bottom stack applied to the third and fourth substrate respectively and a top stack applied to the bottom stack,
   wherein each bottom stack comprises an alternating sequence of high and low refractive index oxidic layers and each top stack comprises an alternating sequence of high and low refractive index fluoridic layers.

5. The polarization system as claimed in claim 1, wherein the first and second substrates are arranged such that the unpolarized beam is parallel to an outgoing beam path.

6. The polarization system as claimed in claim 1, wherein the high and low oxidic layers used are high refractive index aluminum oxide and low refractive index silicon oxide.

7. The polarization system as claimed in claim 1, wherein the high and low fluoridic layers used are high refractive index lanthanum fluoride, gadolinium fluoride or neodymium fluoride and low refractive index magnesium fluoride, aluminum fluoride, cryolite or chiolite.

8. The polarization system as claimed in claim 1, wherein a sum of the number of oxidic and fluoridic layers of the first stack and second stack is greater than 40.

9. The polarization system as claimed in claim 1, wherein the polarization system is designed for wavelength ranges between 170 and 230 nm.

10. A polarization system, comprising:
    a first substrate having a first stack disposed on the first substrate and a second stack disposed directly on the first stack, the first stack and the second stack forming a first layer system;
    a second substrate having a third stack disposed on the second substrate and a fourth stack disposed directly on the third stack, the third stack and the fourth stack forming a second layer system; and
    a light source providing a light beam impinging on the first layer system, the light beam including a first polarized type and a second polarized type,
    wherein the first stack and the third stack comprise an alternating sequence of high and low refractive index oxidic layers,
    wherein the second stack and the fourth stack comprise an alternating sequence of high and low refractive index fluoridic layers,
    wherein the first layer system splitting the light beam into a first reflected beam composed of the first polarized type and a first transmitted beam composed of the second polarized type, the first transmitted beam propagating through the first substrate,
    wherein the first reflected beam impinges on the second layer system, the second layer system splitting the first reflected beam into a second reflected beam and a second transmitted beam, the second transmitted beam propagating through the second substrate,
    wherein the second reflected beam is composed substantially of the first polarized type,
    wherein the first polarized type is present in a greater proportion in the second reflected beam downstream of the second layer system than in the first reflected beam downstream of the first layer system,
    wherein the first substrate material is calcium fluoride, and
    wherein the second substrate material is quartz glass.

* * * * *